US012673679B2

(12) United States Patent
Kang

(10) Patent No.: US 12,673,679 B2
(45) Date of Patent: Jul. 7, 2026

(54) APPARATUS FOR CONTROLLING AUTONOMOUS DRIVING AND METHOD THEREOF

(71) Applicants:HYUNDAI MOTOR COMPANY, Seoul (KR); Kia Corporation, Seoul (KR)

(72) Inventor: Dong Hoon Kang, Seoul (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 159 days.

(21) Appl. No.: 18/388,273

(22) Filed: Nov. 9, 2023

(65) Prior Publication Data

US 2025/0010857 A1    Jan. 9, 2025

(51) Int. Cl.
*B60W 30/14* (2006.01)
*B60W 40/076* (2012.01)
*B60W 40/107* (2012.01)
*B60W 60/00* (2020.01)

(52) U.S. Cl.
CPC ........ *B60W 30/146* (2013.01); *B60W 40/076* (2013.01); *B60W 40/107* (2013.01); *B60W 60/001* (2020.02); *B60W 2520/105* (2013.01); *B60W 2552/15* (2020.02); *B60W 2554/4046* (2020.02); *B60W 2556/10* (2020.02); *B60W 2556/20* (2020.02); *B60W 2556/35* (2020.02)

(58) Field of Classification Search
CPC ............. B60W 30/146; B60W 60/001; B60W 40/107; B60W 40/76; B60W 2556/10; B60W 2556/20; B60W 2552/15; B60W 2556/35; B60W 2554/4046; B60W 2520/105; B60W 30/16; B60W 30/162; B60W 30/165; B60W 30/17; B60W 30/182; B60W 50/082; G05D 1/0061; G05D 1/0088; G05D 1/021; G05D 1/0214; G05D 1/0221; G05D 1/0223; B60K 28/00–165; B60G 2400/10
USPC .......................................................... 701/93
See application file for complete search history.

(56) References Cited

U.S. PATENT DOCUMENTS

| | | | | |
|---|---|---|---|---|
| 8,798,841 B1 * | 8/2014 | Nickolaou | ......... | B62D 15/0265 |
| | | | | 701/28 |
| 10,065,638 B1 * | 9/2018 | Wood | .................... | B60W 50/14 |
| 11,167,759 B2 * | 11/2021 | Zhao | .................... | B60W 30/16 |
| 11,192,547 B2 * | 12/2021 | Zhang | .................. | B60W 10/04 |

(Continued)

*Primary Examiner* — Manglesh M Patel
(74) *Attorney, Agent, or Firm* — Morgan, Lewis & Bockius LLP

(57) ABSTRACT

An autonomous driving control apparatus may include a sensor device, a memory, and a control device. For example, the autonomous driving control apparatus identifies information related to at least one of a driving state of a host vehicle, a driving mode of the host vehicle, a driving road of the host vehicle, a behavior state of at least one other vehicle adjacent to the host vehicle, or a combination of the driving state, the driving mode, the driving road, and the behavior state by use of the sensor device, activates at least one parameter-variable control for deceleration control of the host vehicle by use of the information, and is configured to control a deceleration of the host vehicle by use of a minimum value among at least one parameter identified based on the at least one parameter-variable control thus activated.

20 Claims, 8 Drawing Sheets

(56)                     References Cited

U.S. PATENT DOCUMENTS

| | | | |
|---|---|---|---|
| 2012/0083987 A1* | 4/2012 | Schwindt | B60W 30/16 |
| | | | 701/96 |
| 2015/0234382 A1* | 8/2015 | Ju | G05D 1/021 |
| | | | 701/23 |
| 2017/0021833 A1* | 1/2017 | Abdel-Rahman | B60W 30/16 |
| 2017/0080939 A1* | 3/2017 | Raghu | B60W 30/16 |
| 2018/0057003 A1* | 3/2018 | Hyun | B60W 60/0016 |
| 2018/0061253 A1* | 3/2018 | Hyun | B60W 30/0956 |
| 2018/0237027 A1* | 8/2018 | Lundsgaard | G01M 17/007 |
| 2019/0031201 A1* | 1/2019 | Lundsgaard | B60W 30/16 |
| 2020/0031348 A1* | 1/2020 | Xiang | B60W 10/04 |
| 2020/0156639 A1* | 5/2020 | Liu | B60W 30/182 |
| 2020/0346646 A1* | 11/2020 | Lee | B60W 50/10 |
| 2020/0384997 A1* | 12/2020 | Lacaze | B60W 30/165 |
| 2021/0001849 A1* | 1/2021 | Miura | B60W 10/08 |
| 2021/0284127 A1* | 9/2021 | Mckeown | B60W 30/09 |
| 2022/0028274 A1* | 1/2022 | Fang | G08G 1/167 |
| 2022/0063618 A1* | 3/2022 | Yasui | B60W 40/105 |
| 2022/0363292 A1* | 11/2022 | Yang | B60W 30/162 |
| 2023/0192084 A1* | 6/2023 | Choi | B60W 30/16 |
| 2023/0286503 A1* | 9/2023 | Miura | B60W 40/107 |
| 2023/0286504 A1* | 9/2023 | Kang | B60W 60/001 |
| 2024/0400042 A1* | 12/2024 | An | B60W 30/09 |
| 2026/0070587 A1* | 3/2026 | Vasudevan | B60W 60/00274 |

* cited by examiner

AUTONOMOUS DRIVING CONTROL
APPARATUS 100

SENSOR DEVICE 110

MEMORY 120

CONTROL DEVICE 130

FIG.1

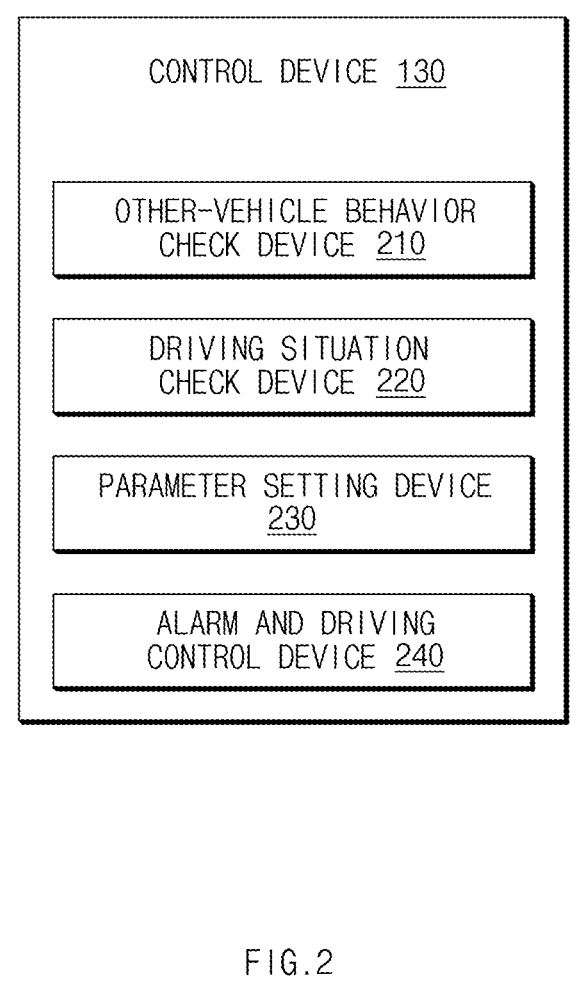

CONTROL DEVICE 130

OTHER-VEHICLE BEHAVIOR
CHECK DEVICE 210

DRIVING SITUATION
CHECK DEVICE 220

PARAMETER SETTING DEVICE
230

ALARM AND DRIVING
CONTROL DEVICE 240

FIG.2

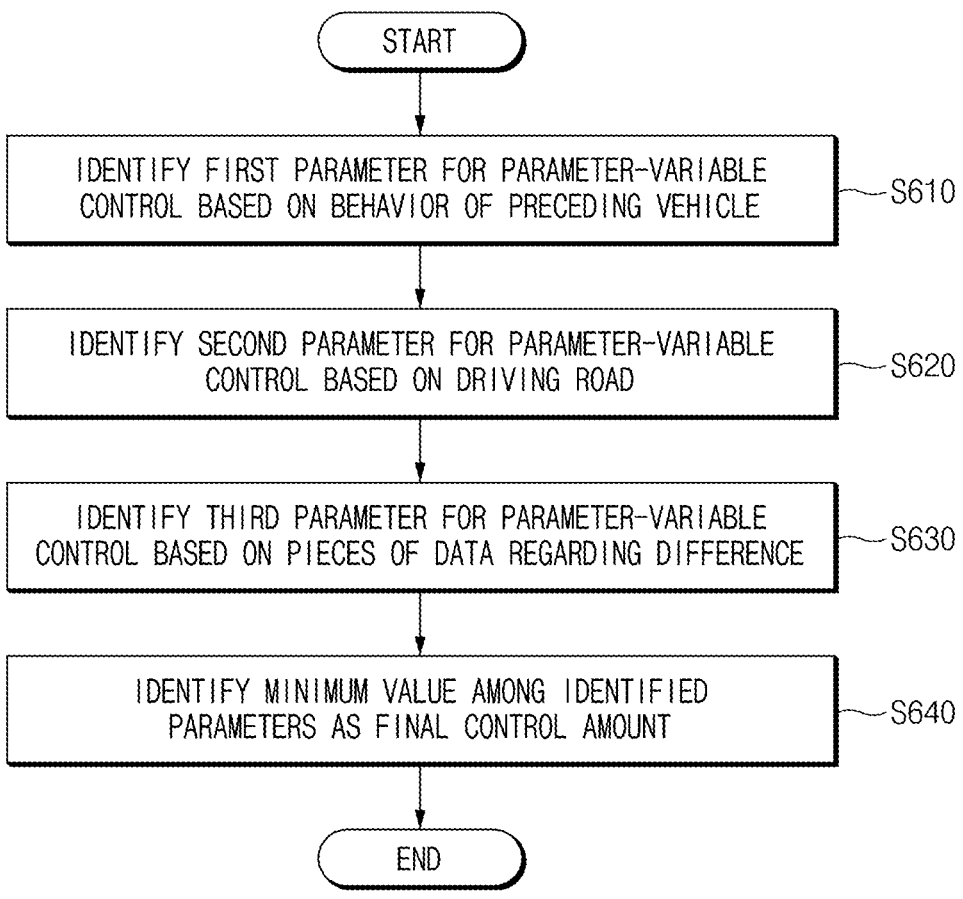

START

IDENTIFY FIRST PARAMETER FOR PARAMETER-VARIABLE CONTROL BASED ON BEHAVIOR OF PRECEDING VEHICLE — S610

IDENTIFY SECOND PARAMETER FOR PARAMETER-VARIABLE CONTROL BASED ON DRIVING ROAD — S620

IDENTIFY THIRD PARAMETER FOR PARAMETER-VARIABLE CONTROL BASED ON PIECES OF DATA REGARDING DIFFERENCE — S630

IDENTIFY MINIMUM VALUE AMONG IDENTIFIED PARAMETERS AS FINAL CONTROL AMOUNT — S640

END

FIG.6

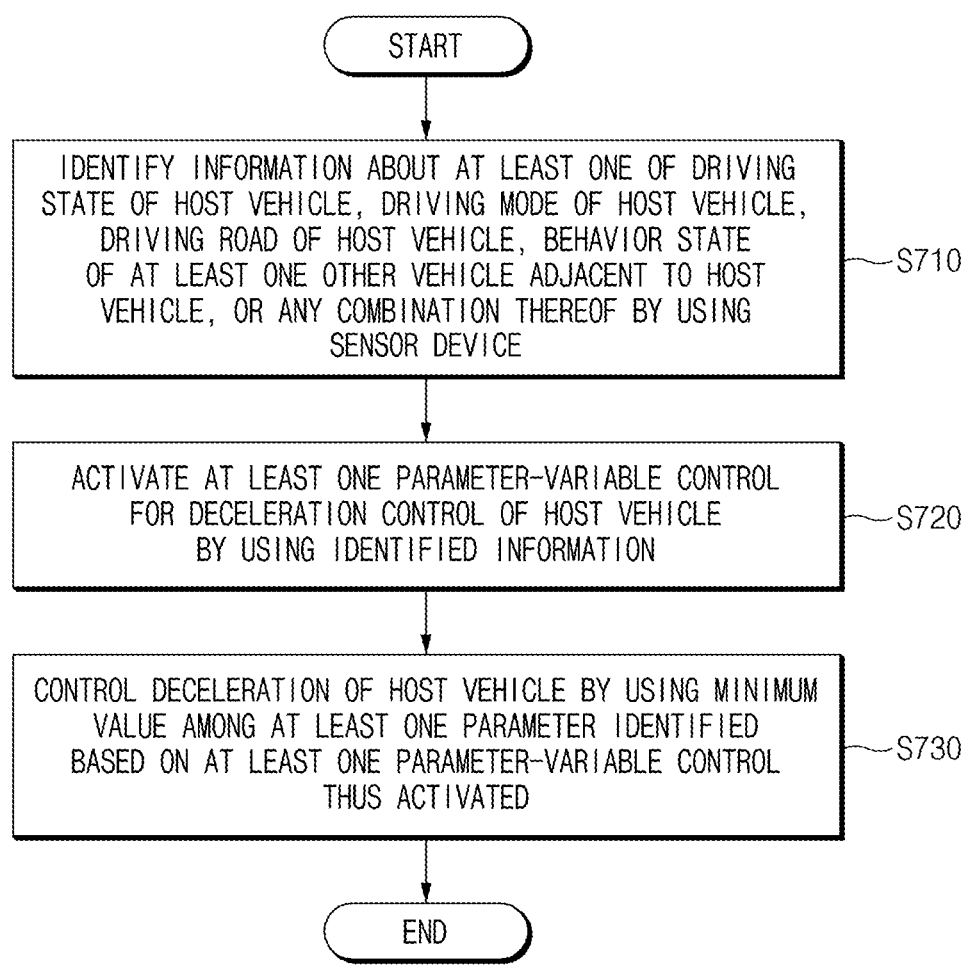

START

IDENTIFY INFORMATION ABOUT AT LEAST ONE OF DRIVING STATE OF HOST VEHICLE, DRIVING MODE OF HOST VEHICLE, DRIVING ROAD OF HOST VEHICLE, BEHAVIOR STATE OF AT LEAST ONE OTHER VEHICLE ADJACENT TO HOST VEHICLE, OR ANY COMBINATION THEREOF BY USING SENSOR DEVICE ~S710

ACTIVATE AT LEAST ONE PARAMETER-VARIABLE CONTROL FOR DECELERATION CONTROL OF HOST VEHICLE BY USING IDENTIFIED INFORMATION ~S720

CONTROL DECELERATION OF HOST VEHICLE BY USING MINIMUM VALUE AMONG AT LEAST ONE PARAMETER IDENTIFIED BASED ON AT LEAST ONE PARAMETER-VARIABLE CONTROL THUS ACTIVATED ~S730

END

FIG.7

APPARATUS FOR CONTROLLING AUTONOMOUS DRIVING AND METHOD THEREOF

CROSS-REFERENCE TO RELATED APPLICATION

The present application claims priority to Korean Patent Application No. 10-2023-0087869, filed on Jul. 6, 2023, the entire contents of which is incorporated herein for all purposes by this reference.

BACKGROUND OF THE PRESENT DISCLOSURE

Field of the Present Disclosure

The present disclosure relates to an autonomous driving control apparatus and a method thereof, and more particularly, relates to a technology for controlling the deceleration of a host vehicle in consideration of the overall driving environment.

Description of Related Art

As autonomous driving vehicles are gradually spread, various technologies related to autonomous driving are being developed. The autonomous driving may be divided into partial autonomous driving, conditional autonomous driving, highly autonomous driving, and/or fully autonomous driving depending on a control level.

In the meantime, among autonomous driving control functions, various functions (e.g., smart cruise control (SCC)) of controlling a control amount (e.g., acceleration and/or deceleration) related to the driving speed of a host vehicle are being developed. For example, while performing autonomous driving control on the host vehicle, the autonomous driving control apparatus may control acceleration and/or deceleration of the host vehicle within a specific limited range.

An autonomous driving control apparatus according to the related art may finally identify a final required acceleration for controlling the host vehicle in consideration with a difference between a required acceleration identified (or calculated) by a control device for the control of the host vehicle, and an actual acceleration of the host vehicle identified by use of a sensor. For example, an autonomous driving control apparatus may identify the final required acceleration based on a required acceleration limit range set based on the driving speed of the host vehicle, and/or a required acceleration limit range set based on a required acceleration value calculated based on an autonomous driving control algorithm.

However, because a method according to the related art identifies the control amount for controlling the acceleration and/or deceleration of the host vehicle based on a uniform criterion, there is no choice but to calculate the control amount as conservatively as possible due to a user's safety or riding comfort.

Moreover, because the method according to the related art does not sufficiently consider the vehicle type and driving situation (e.g., at least one of the driving state of the other vehicle, the driving mode of the host vehicle, a driving road state, or any combination thereof) of the host vehicle, a dangerous situation of colliding with an external object may occur when rapid deceleration is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a function of controlling the deceleration of a host vehicle by use of information related to at least one of the driving state of the host vehicle, the driving mode of the host vehicle, the driving road of the host vehicle, a behavior state of at least one other vehicle adjacent to the host vehicle, or any combination thereof.

Various aspects of the present disclosure are directed to providing a function of identifying data related to the deceleration of another vehicle in front of the host vehicle, and activating parameter-variable control used to change a parameter for deceleration control of the host vehicle based on whether the number (or capacity) and/or accuracy of data satisfies predetermined conditions.

Various aspects of the present disclosure are directed to providing a function of activating slope-based parameter-variable control based on at least one of whether a slope of the driving road on which the host vehicle is driving is included in a predetermined range, a required acceleration, an actual acceleration of the host vehicle, or any combination thereof.

Various aspects of the present disclosure are directed to providing a function of identifying the driving mode of the host vehicle, and activating the parameter-variable control based on characteristics of a driving mode based on at least one of the identified driving mode, a required acceleration for each speed section of the driving mode, the actual acceleration of the host vehicle, or any combination thereof.

Various aspects of the present disclosure are directed to providing a function of permanently storing (or applying) a parameter changed through parameter-variable control among at least one parameter-variable control for the deceleration control of the host vehicle based on the characteristics of the driving mode, and restoring the changed parameter to the original state through variable control of the other parameters when a state of satisfaction of conditions required to activate the variable control of the corresponding parameter is released.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an autonomous driving control apparatus includes a sensor device, a memory that stores instructions, and a control device operatively connected to the sensor device and the memory. For example, the instructions, in response to execution of the control device, cause the autonomous driving control apparatus to identify information related to at least one of a driving state of a host vehicle, a driving mode of the host vehicle, a driving road of the host vehicle, a behavior state of at least one other vehicle adjacent to the host vehicle, or a combination of the driving state, the driving mode, the driving road, and the behavior state by use of the sensor device, to activate at least one parameter-variable control for deceleration control of the host vehicle by use of the information, and to control a deceleration of the host vehicle by use of a minimum value among at least one parameter identified based on the at least one parameter-variable control thus activated.

According to an exemplary embodiment of the present disclosure, the instructions, in response to execution of the control device, may cause the autonomous driving control apparatus to identify the behavior state of the at least one other vehicle including data regarding a deceleration of the at least one other vehicle, which is present in front of the host vehicle, by use of the sensor device, to activate first parameter-variable control based on the behavior state of the at least one other vehicle when at least one of a number of the data, an accuracy of the data, or a combination of the number of the data and the accuracy of the data satisfies a predetermined condition, and to control the deceleration of the host vehicle through a first parameter, which is identified by use of the behavior state of the at least one other vehicle, based on the first parameter-variable control.

According to an exemplary embodiment of the present disclosure, the instructions, in response to execution of the control device, may cause the autonomous driving control apparatus to determine that at least one of the number of the data, the accuracy of the data, or the combination of the number of the data and the accuracy of the data satisfies the predetermined condition, when the number of the data regarding a first vehicle among the at least one other vehicle is repeatedly identified within a predetermined cycle or more than predetermined cycle, or other data regarding the first vehicle, which has a difference of a predetermined value or less than the predetermined value from the data, is identified a predetermined number of times or more than the predetermined number of time.

According to an exemplary embodiment of the present disclosure, the instructions, in response to execution of the control device, may cause the autonomous driving control apparatus to determine whether a second vehicle instead of a first vehicle is identified as a target vehicle for the first parameter-variable control, when identification information of the second vehicle different from the first vehicle is identified while first data regarding a behavior of the first vehicle among the at least one other vehicle is identified, to set a reliability to a random value between 0 and 1 within a second cycle, which is a cycle following a first cycle, and to obtain second data regarding the second vehicle when the second vehicle is not identified as the target vehicle within the first cycle, and to determine that at least one of the number of the data, the accuracy of the data, or the combination of the number of the data and the accuracy of the data satisfies the predetermined condition, when the reliability identified based on at least one of a number of the second data, an accuracy of the second data, or a combination of the number of the second data and the accuracy of the second data is 1.

According to an exemplary embodiment of the present disclosure, the instructions, in response to execution of the control device, may cause the autonomous driving control apparatus to identify a slope of the driving road by use of the sensor device, and to determine whether to activate second parameter-variable control based on the slope, based on at least one of whether the slope is included in a predetermined range, a first required acceleration, an actual acceleration of the host vehicle, or a combination of whether the slope is included in the predetermined range, the first required acceleration, and the actual acceleration of the host vehicle.

According to an exemplary embodiment of the present disclosure, the instructions, in response to execution of the control device, may cause the autonomous driving control apparatus to activate the second parameter-variable control when the slope is included in the predetermined range, and a difference between the first required acceleration and the actual acceleration is greater than or equal to a reference value, and to control the deceleration of the host vehicle through a second parameter, which is identified by use of the difference, based on the second parameter-variable control.

According to an exemplary embodiment of the present disclosure, the instructions, in response to execution of the control device, may cause the autonomous driving control apparatus to identify the driving mode of the host vehicle by use of the sensor device, and to determine whether to activate third parameter-variable control based on characteristics of the driving mode, based on at least one of the driving mode, a second required acceleration for each speed section of the driving mode, an actual acceleration of the host vehicle, or a combination of the driving mode, the second required acceleration for each speed section of the driving mode, and the actual acceleration of the host vehicle.

According to an exemplary embodiment of the present disclosure, the instructions, in response to execution of the control device, may cause the autonomous driving control apparatus to activate the third parameter-variable control, when error data including a difference between the second required acceleration and the actual acceleration is greater than or equal to a predetermined number, and to control the deceleration of the host vehicle through a third parameter, which is identified by use of an average error value of the error data, based on the third parameter-variable control.

According to an exemplary embodiment of the present disclosure, the instructions, in response to execution of the control device, may cause the autonomous driving control apparatus to restore a parameter for controlling the deceleration of the host vehicle to a value prior to using a minimum value, based on identifying that the behavior state or a slope does not satisfy a condition for generating a parameter, while controlling the deceleration of the host vehicle by use of the minimum value corresponding to a first parameter generated based on the behavior state of the at least one other vehicle or a second parameter generated based on the slope of the driving road.

According to an exemplary embodiment of the present disclosure, the instructions, in response to execution of the control device, may cause the autonomous driving control apparatus to determine whether there is a history in which a third parameter generated based on characteristics of the driving mode of the host vehicle is applied to control the deceleration, while controlling the deceleration of the host vehicle, based on the minimum value corresponding to the first parameter or the second parameter, when identifying that the behavior state or the slope does not satisfy the condition for generating the parameter, and to change the parameter for controlling the deceleration of the host vehicle to a value to which the third parameter is applied, when the history is present.

According to an aspect of the present disclosure, an autonomous driving control method includes identifying, by a control device, information related to at least one of a driving state of a host vehicle, a driving mode of the host vehicle, a driving road of the host vehicle, a behavior state of at least one other vehicle adjacent to the host vehicle, or a combination of the driving state, the driving mode, the driving road, and the behavior state by use of a sensor device, activating, by the control device, at least one parameter-variable control for deceleration control of the host vehicle by use of the information, and controlling, by the control device, a deceleration of the host vehicle by use of a minimum value among at least one parameter identified based on the at least one parameter-variable control thus activated.

According to an exemplary embodiment of the present disclosure, the controlling, by the control device, of the deceleration of the host vehicle may further include identifying, by the control device, the behavior state of the at least one other vehicle including data regarding a deceleration of the at least one other vehicle, which is present in front of the host vehicle, by use of the sensor device, activating, by the control device, first parameter-variable control based on the behavior state of the at least one other vehicle when at least one of a number of the data, an accuracy of the data, or a combination of the number of the data and the accuracy of the data satisfies a predetermined condition, and controlling, by the control device, the deceleration of the host vehicle through a first parameter, which is identified by use of the behavior state of the at least one other vehicle, based on the first parameter-variable control.

According to an exemplary embodiment of the present disclosure, the activating, by the control device, of the first parameter-variable control based on the behavior state of the at least one other vehicle when the at least one of the number of the data, the accuracy of the data, or the combination of the number of the data and the accuracy of the data satisfies the predetermined condition may further include determining, by the control device, that at least one of the number of the data, the accuracy of the data, or the combination of the number of the data and the accuracy of the data satisfies the predetermined condition, when the number of the data regarding a first vehicle among the at least one other vehicle is repeatedly identified within a predetermined cycle or more than predetermined cycle, or other data regarding the first vehicle, which has a difference of a predetermined value or less than the predetermined value from the data, is identified a predetermined number of times or more than the predetermined number of time.

According to an exemplary embodiment of the present disclosure, the activating, by the control device, of the first parameter-variable control based on the behavior state of the at least one other vehicle when the at least one of the number of the data, the accuracy of the data, or the combination of the number of the data and the accuracy of the data satisfies the predetermined condition may further include determining, by the control device, whether a second vehicle instead of a first vehicle is identified as a target vehicle for the first parameter-variable control, when identification information of the second vehicle different from the first vehicle is identified while first data regarding a behavior of the first vehicle among the at least one other vehicle is identified, setting, by the control device, a reliability to a random value between 0 and 1 within a second cycle, which is a cycle following a first cycle, and obtaining second data regarding the second vehicle, when the second vehicle is not identified as the target vehicle within the first cycle, and determining, by the control device, that at least one of the number of the data, the accuracy of the data, or the combination of the number of the data and the accuracy of the data satisfies the predetermined condition, when the reliability identified based on at least one of a number of the second data, an accuracy of the second data, or a combination of the number of the second data and the accuracy of the second data is 1.

According to an exemplary embodiment of the present disclosure, the controlling, by the control device, of the deceleration of the host vehicle may further include identifying, by the control device, a slope of the driving road by use of the sensor device and determining, by the control device, whether to activate second parameter-variable control based on the slope, based on at least one of whether the slope is included in a predetermined range, a first required acceleration, an actual acceleration of the host vehicle, or a combination of whether the slope is included in the predetermined range, the first required acceleration, and the actual acceleration of the host vehicle.

According to an exemplary embodiment of the present disclosure, the controlling, by the control device, of the deceleration of the host vehicle may further include activating, by the control device, the second parameter-variable control when the slope is included in the predetermined range, and a difference between the first required acceleration and the actual acceleration is greater than or equal to a reference value, and controlling, by the control device, the deceleration of the host vehicle through a second parameter, which is identified by use of the difference, based on the second parameter-variable control.

According to an exemplary embodiment of the present disclosure, the controlling, by the control device, of the deceleration of the host vehicle may further include identifying, by the control device, the driving mode of the host vehicle by use of the sensor device and determining, by the control device, whether to activate third parameter-variable control based on characteristics of the driving mode, based on at least one of the driving mode, a second required acceleration for each speed section of the driving mode, an actual acceleration of the host vehicle, or a combination of the driving mode, the second required acceleration for each speed section of the driving mode, and the actual acceleration of the host vehicle.

According to an exemplary embodiment of the present disclosure, the controlling, by the control device, of the deceleration of the host vehicle may further include activating, by the control device, the third parameter-variable control, when error data including a difference between the second required acceleration and the actual acceleration is greater than or equal to a predetermined number and controlling, by the control device, the deceleration of the host vehicle through a third parameter, which is identified by use of an average error value of the error data, based on the third parameter-variable control.

According to an exemplary embodiment of the present disclosure, the autonomous driving control method may further include restoring, by the control device, a parameter for controlling the deceleration of the host vehicle to a value prior to using a minimum value, based on identifying that the behavior state or a slope does not satisfy a condition for generating a parameter, while controlling the deceleration of the host vehicle by use of the minimum value corresponding to a first parameter generated based on the behavior state of the at least one other vehicle or a second parameter generated based on the slope of the driving road.

According to an exemplary embodiment of the present disclosure, the autonomous driving control method may further include determining, by the control device, whether there is a history in which a third parameter generated based on characteristics of the driving mode of the host vehicle is applied to control the deceleration, while controlling the deceleration of the host vehicle, based on the minimum value corresponding to the first parameter or the second parameter, when identifying that the behavior state or the slope does not satisfy the condition for generating the parameter, and changing, by the control device, the parameter for controlling the deceleration of the host vehicle to a value to which the third parameter is applied, when the history is present.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a block diagram showing components of an autonomous driving control apparatus, according to an exemplary embodiment of the present disclosure;

FIG. 2 is a block diagram showing components of an autonomous driving control apparatus, according to an exemplary embodiment of the present disclosure;

FIG. 6 is an operation flowchart of an autonomous driving control apparatus, according to an exemplary embodiment of the present disclosure;

FIG. 7 is an operation flowchart of an autonomous driving control apparatus, according to an exemplary embodiment of the present disclosure.

Figure 3:
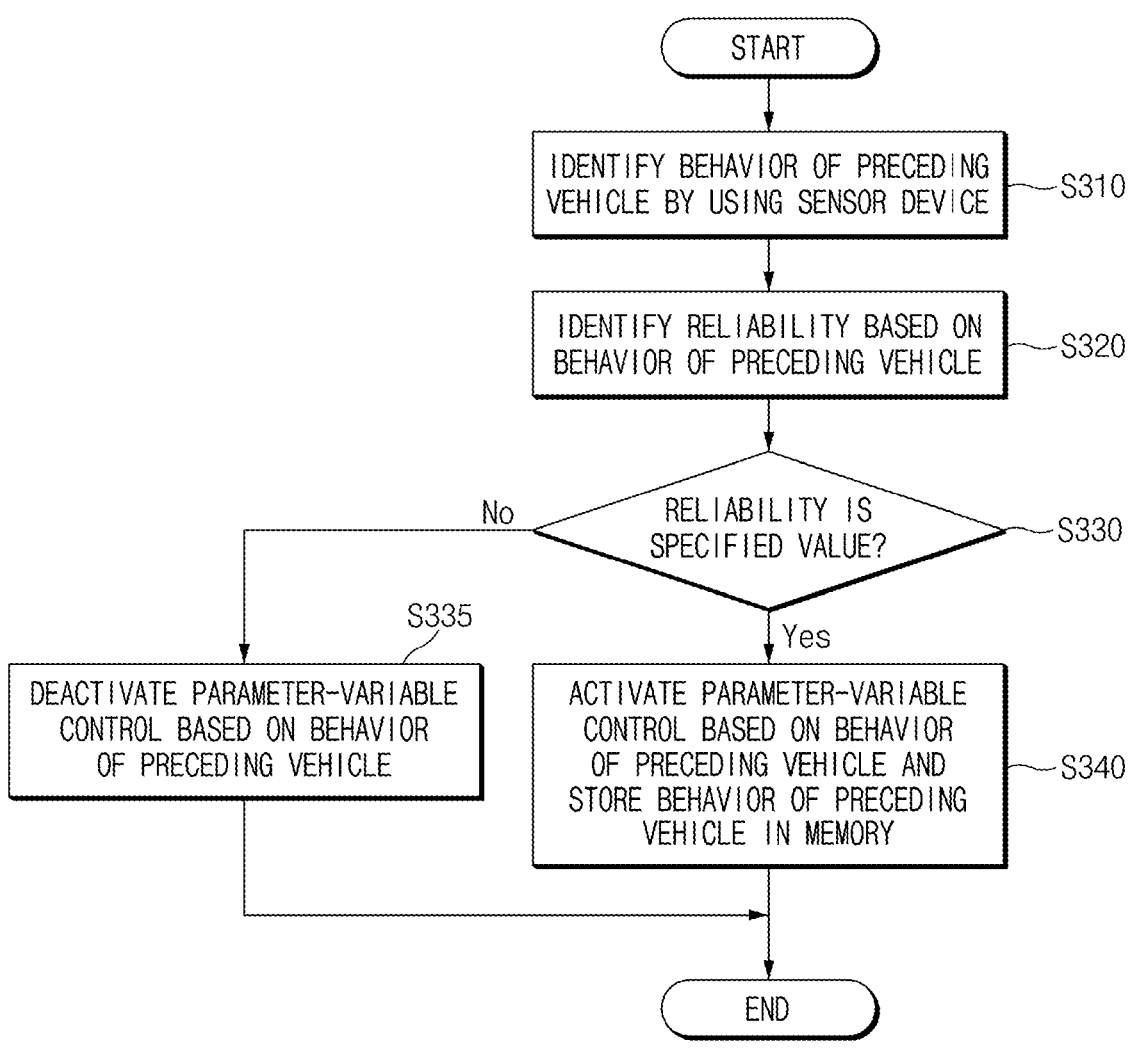
FIG. 3 is an operation flowchart of an autonomous driving control apparatus, according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

With regard to description of drawings, the same or similar components will be marked by the same or similar reference signs.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding reference numerals to components of each drawing, it should be noted that the same components have the same reference numerals, although they are indicated on another drawing. Furthermore, in describing the exemplary embodiments of the present disclosure, detailed descriptions associated with well-known functions or configurations will be omitted when they may make subject matters of the present disclosure unnecessarily obscure.

In describing elements of an exemplary embodiment of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as including a meaning which is consistent with their meaning in the context of the present disclosure and the relevant art and will not be interpreted in an idealized or overly formal sense unless so defined herein.

Figure 1:
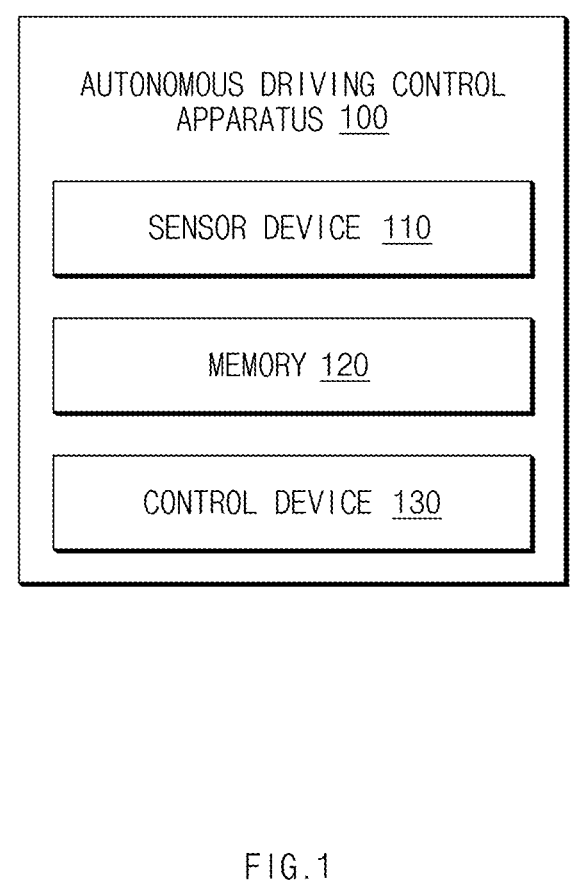

Hereinafter, various embodiments of the present disclosure will be described in detail with reference to FIG. 1, FIG. 2, FIG. 3, FIG. 4, FIG. 5, FIG. 6, FIG. 7, and FIG. 8. FIG. 1 is a block diagram showing components of an autonomous driving control apparatus, according to an exemplary embodiment of the present disclosure.

According to an exemplary embodiment of the present disclosure, an autonomous driving control apparatus 100 may include at least one of a sensor device 110, a memory 120, a control device 130, or any combination thereof. The configuration of the autonomous driving control apparatus 100 shown in FIG. 1 is an example, and embodiments of the present disclosure are not limited thereto. For example, the autonomous driving control apparatus 100 may further include components (e.g., at least one of an interface device, a communication device, a display device, or any combination thereof) not shown in FIG. 1.

According to an exemplary embodiment of the present disclosure, the sensor device 110 may obtain (or sense) various pieces of information used for the driving of a host vehicle.

For example, the sensor device 110 may include at least one sensor including at least one of a camera, radio detection and ranging (RADAR), LiDAR, or any combination thereof.

For example, the sensor device 110 may identify information related to at least one of the driving state of the host vehicle, the driving mode of the host vehicle, the driving road of the host vehicle, an area adjacent to the host vehicle, or any combination thereof.

For example, the sensor device 110 may identify information related to a driving state of the host vehicle including at least one of an actual (or real-time) driving speed of the host vehicle, a driving direction of the host vehicle, a driving acceleration and/or deceleration of the host vehicle, or any combination thereof. For example, the control device 130 may compare a required acceleration determined (or identified) to control the host vehicle with an actual deceleration of the host vehicle being driven based on the required acceleration, and may identify the difference between the required acceleration and the actual deceleration.

For example, the sensor device 110 may identify the driving mode of the host vehicle. The host vehicle, for example, an autonomous driving control apparatus, may be configured for controlling driving of the host vehicle based on various driving modes (e.g., an economical mode, a comfort mode, or a sports mode). For example, above-described driving modes may be classified based on at least one of fuel economy, a limited driving speed, a limited driving acceleration and/or deceleration, or any combination thereof.

For example, the sensor device 110 may identify various pieces of information related to the driving road of the host vehicle. The sensor device 110 may identify, for example, a slope of a driving road on which the host vehicle is driving. For example, the control device 130 may be configured to determine (or identify) whether the identified slope is included in a predetermined range.

For example, the sensor device 110 may identify various pieces of information related to an area adjacent to the host vehicle. For example, the sensor device 110 may identify information (e.g., a driving speed of another vehicle, a driving acceleration and/or deceleration of the other vehicle, or a driving direction of the other vehicle) about at least one other vehicle placed in an area (e.g., a front area) adjacent to the host vehicle.

According to an exemplary embodiment of the present disclosure, the memory 120 may store instructions or data. For example, the memory 120 may store one or more instructions that cause the autonomous driving control apparatus 100 to perform various operations when executed by the control device 130.

For example, the memory 120 and the control device 130 may be implemented as one chipset. The control device 130 may include at least one of a communication processor or a modem.

In various exemplary embodiments of the present disclosure, the control device 120 may be implemented in a form of hardware or software, or may be implemented in a combination of hardware and software.

According to an exemplary embodiment of the present disclosure, the control device 130 may be operatively connected to the sensor device 110 and/or the memory 120. For example, the control device 130 may be configured for controlling the operation of the sensor device 110 and/or the memory 120.

For example, the control device 130 may identify information related to at least one of the driving state of the host vehicle, the driving mode of the host vehicle, the driving road of the host vehicle, the behavior state of at least one other vehicle adjacent to the host vehicle, or any combination thereof by use of the sensor device 110.

For example, the control device 130 may activate at least one parameter-variable control for controlling the deceleration of the host vehicle by use of at least part of the identified information.

For example, the parameter-variable control may be used when the control amount required for controlling the deceleration of the host vehicle is generated based on at least part of the identified information. For example, the parameter-variable control may be a control algorithm used to change a parameter (e.g., limit deceleration) used to generate the control amount.

For example, the control device 130 may be configured for controlling the deceleration of the host vehicle by use of a minimum value among at least one parameter identified based on at least one parameter-variable control thus activated.

For example, the control device 130 may be configured to determine whether to activate first parameter-variable control, based on the behavior state of at least one other vehicle placed in an area adjacent to the host vehicle, and may be configured for controlling the deceleration of the host vehicle by use of a first parameter generated based on the first parameter-variable control.

For example, the control device 130 may identify the behavior state of at least one other vehicle including data regarding at least one deceleration of the at least one other vehicle placed in front of the host vehicle, by use of the sensor device 110. In other words, the control device 130 may identify at least one other vehicle, which is present in front of the host vehicle and which has a possibility of colliding with the host vehicle while being driven with a specific deceleration, and may identify a behavior state including a deceleration, a driving speed, and a driving direction of the at least one other vehicle.

For example, the control device 130 may be configured to determine whether at least one of the number (or capacity) of data regarding the behavior state of the at least one other vehicle, the accuracy of the data, or any combination thereof satisfies a predetermined condition.

For example, when the number of data regarding a first vehicle among at least one other vehicle is repeatedly identified within a specified cycle (e.g., 1000 cycles) or more, or other data regarding the first vehicle having a difference of a predetermined value or less than the predetermined value from the data (e.g., a difference in acceleration value of $0.2$ m/s$^2$) is identified the predetermined number of times (e.g., 5 times) or more, the control device 130 may identify (or determine) that at least one of the number of data, the accuracy of the data, or any combination thereof satisfies the predetermined condition.

For example, when identification information of a second vehicle different from the first vehicle is identified while the control device 130 identifies first data regarding the behavior of the first vehicle among the at least one other vehicle, the control device 130 may be configured to determine whether the second vehicle instead of the first vehicle is identified as a target vehicle for first parameter-variable control. In other words, it may be determined whether the first vehicle is no longer likely to collide with the host vehicle, and/or whether the driving direction, driving speed, and/or driving acceleration of the first vehicle do not correlate with the behavior of the host vehicle.

For example, when the second vehicle is not identified as the target vehicle within the first cycle, the control device 130 may set the reliability to a random value (e.g., 0.5) between 0 and 1 within a second cycle, which is a cycle following a first cycle, and may obtain second data regarding the second vehicle.

For example, when the reliability identified based on at least one of the number of second data, the accuracy of second data, or any combination thereof is 1 (e.g., when the reliability of the second data is identified as 1 in a process of obtaining the second data after the reliability of the second data is set to an arbitrary value), the control device 130 may be configured to determine that at least one of the number of data, the accuracy of the data, or any combination thereof satisfies the predetermined condition.

For example, when at least one of the number of data, accuracy of the data, or any combination thereof satisfies the predetermined condition (e.g., when the reliability of the data is 1), the control device 130 may activate the first parameter-variable control. The first parameter-variable control may include a deceleration control algorithm that changes a deceleration limit value of the host vehicle to a first parameter based on, for example, the behavior state of the other vehicle.

For example, the control device 130 may be configured to determine whether to activate second parameter-variable control, based on a slope of a driving road, and may be configured for controlling the deceleration of the host vehicle by use of a second parameter generated based on the second parameter-variable control.

For example, the control device 130 may identify the slope of a driving road, on which the host vehicle is driving, by use of the sensor device 110. For example, the control device 130 may be configured to determine whether a slope is included in a predetermined range. For example, the control device 130 may identify a first required acceleration generated to control the host vehicle, in consideration of the slope of the driving road, the driving state of the host vehicle, and surrounding conditions. For example, the control device 130 may identify the actual (or real-time) acceleration of the host vehicle being driven based on a first required acceleration. For example, the control device 130 may be configured to determine whether to activate slope-based second parameter-variable control based on at least one of whether a slope is included in the predetermined range, a first required acceleration, an actual acceleration of the host vehicle, or any combination thereof, For example, when the slope is included in a predetermined range (e.g., a climbing section range where the slope exceeds 4% or a climbing section range where the slope is less than −4%) and a difference between the first required acceleration and the actual acceleration is greater than or equal to a reference value (e.g., 0.2 m/s²), the control device 130 may activate the second parameter-variable control.

For example, the control device 130 may identify the second parameter based on the second parameter-variable control. For example, the second parameter may be determined (or identified) by a gain value set by the control device 130 in proportion to a difference between the first required acceleration and the actual acceleration. For example, the second parameter-variable control may include a deceleration control algorithm that changes a deceleration limit value of the host vehicle to the second parameter based on a slope of the driving road, on which the host vehicle is driving, and/or a difference between the first required acceleration and the actual acceleration.

For example, the control device 130 may be configured to determine whether to activate third parameter-variable control, based on characteristics of the driving mode of the host vehicle, and may be configured for controlling the deceleration of the host vehicle by use of a third parameter generated based on the third parameter-variable control.

For example, the control device 130 may identify the driving mode of the host vehicle by use of the sensor device 110. The control device 130 may identify the driving mode of the host vehicle by use of components (e.g., a communication device) other than the sensor device 110.

For example, the control device 130 may identify characteristics of the driving mode of the host vehicle. For example, the control device 130 may identify a real-time driving mode of the host vehicle among various driving modes (e.g., an economical mode, a comfort mode, and a sports mode). The control device 130 may identify characteristics (e.g., at least one of fuel economy, a limited driving speed, a limited driving acceleration and/or deceleration, a required acceleration for each speed section, or any combination thereof) of the identified driving mode.

For example, based on at least one of the driving mode, a second required acceleration for each speed section of the driving mode, an actual acceleration of the host vehicle, or any combination thereof, the control device 130 may be configured to determine whether to activate the third parameter-variable control based on the characteristics of the driving mode.

For example, the control device 130 may identify the second required acceleration for each speed section required in the real-time driving mode of the host vehicle. The control device 130 may be configured for controlling the host vehicle by use of the second required acceleration and may identify the actual acceleration of the host vehicle by use of the sensor device 110.

For example, when error data including a difference between the second required acceleration and the actual acceleration is greater than or equal to the predetermined number (e.g., 300) (or the specified capacity), the control device 130 may activate the third parameter-variable control.

For example, the control device 130 may identify a third parameter based on the third parameter-variable control. The third parameter may be determined (or identified) by a gain value set by the control device 130 by using, for example, an average error value of error data. For example, the third parameter-variable control may include a deceleration control algorithm that changes the deceleration limit value of the host vehicle to the third parameter based on at least one of an average error value of the error data, a difference between the second required acceleration and the actual acceleration, or any combination thereof.

For example, when there is a plurality of parameters identified based on at least one parameter-variable control (e.g., when all the first and third parameters are identified), the deceleration of the host vehicle may be controlled by use of the minimum value among the plurality of parameters.

For example, when at least part of conditions for activation of at least one parameter-variable control is no longer satisfied, the control device 130 may restore or change a parameter for controlling a deceleration.

For example, while the control device 130 controls the deceleration of the host vehicle by use of a minimum value corresponding to the first parameter generated based on the behavior state of at least one other vehicle or the second parameter generated based on the slope of the driving road, the control device 130 may restore a parameter for controlling the deceleration of the host vehicle to a value prior to using the minimum value based on identifying that the behavior state or slope does not satisfy the condition for generating a parameter.

For example, while the control device 130 controls the deceleration of the host vehicle, based on the minimum value corresponding to the first parameter or the second parameter, when identifying that the behavior state or slope does not satisfy the condition for generating a parameter, the control device 130 may be configured to determine whether there is a history in which the third parameter generated based on the characteristics of the driving mode of the host vehicle is applied to control deceleration.

For example, when there is a deceleration control history based on the third parameter, a parameter for controlling the deceleration of the host vehicle may be changed to a value to which the third parameter is applied. In other words, instead of restoring a parameter for an initial deceleration to an initial state, the parameter for an initial deceleration may be changed to a value to which the third parameter is applied.

For example, the control device 130 may store at least one of parameters (e.g., the first, second, and third parameters) identified while the control device 130 performs at least one parameter-variable control, a history of at least one parameter-variable control, or any combination thereof in the memory 120.

FIG. 2 is a block diagram showing components of an autonomous driving control apparatus, according to an exemplary embodiment of the present disclosure.

According to an exemplary embodiment of the present disclosure, the control device 130 included in an autonomous driving control apparatus (e.g., the autonomous driving control apparatus 100 of FIG. 1) may include at least one of an other-vehicle behavior check device 210, a driving situation check device 220, a parameter setting device 230, an alarm and driving control device 240, or any combination thereof.

Components of the control device 130 illustrated in FIG. 2 is an example, and embodiments of the present disclosure are not limited thereto. For example, at least part of components shown as being included in the control device 130 in FIG. 2 may be implemented as a separate chip physically separated from the control device 130. For another example, at least part (e.g., the other-vehicle behavior check device 210 and/or the driving situation check device 220) of components shown as being included in the control device 130 in FIG. 2 may be implemented as a single chip with another component (e.g., the sensor device 110 in FIG. 1) of the autonomous driving control apparatus.

For example, the other-vehicle behavior check device 210 may identify information related to the behavior state of at least one other vehicle adjacent to the host vehicle.

For example, the other-vehicle behavior check device 210 may identify a deceleration (e.g., a longitudinal direction deceleration) of at least one other vehicle placed in front of the host vehicle.

For example, the other-vehicle behavior check device 210 may be configured to determine whether the deceleration of at least one other vehicle in front is less than a predetermined deceleration value for driving control of the host vehicle.

For example, when the deceleration of at least one other vehicle in front is less than the predetermined deceleration value for driving control of the host vehicle, the control device 130 may activate first parameter-variable control.

For example, the driving situation check device 220 may analyze a behavior situation of the host vehicle according to the driving situation of the host vehicle and may be configured to determine whether a predetermined maximum deceleration limit parameter needs to be changed.

For example, the driving situation check device 220 may be configured to determine whether a slope of a road on which the host vehicle is driving is included in a predetermined range. When the slope of a road is included in the predetermined range, the driving situation check device 220 may change a parameter (e.g., a limit deceleration) for controlling the deceleration of the host vehicle based on at least one of the magnitude of the slope, a difference between the first required acceleration and the actual acceleration of the host vehicle, or any combination thereof.

For example, the driving situation check device 220 may identify characteristics of the driving mode of the host vehicle, may identify a second required acceleration for each speed section of each driving mode, and may identify a difference between the second required acceleration and the actual acceleration of the host vehicle. For example, the control device 130 may change a parameter for controlling the deceleration of the host vehicle based on at least one of the number (or capacity) of data regarding a driving mode, an average error of pieces of data, a difference between the second required acceleration and the actual acceleration of the vehicle, or any combination thereof.

For example, the parameter setting device 230 may set and change various parameters for controlling the deceleration of the host vehicle.

For example, the parameter setting device 230 may set and change a parameter (e.g., a limit deceleration) for deceleration of the host vehicle. For example, the parameter setting device 230 may change a parameter (e.g., a limit deceleration) for controlling the deceleration of the host vehicle to at least one parameter generated (or identified) based on the activation of at least one parameter-variable control.

For example, after the parameter for controlling the deceleration of the host vehicle is changed to a first parameter and/or a second parameter, which is generated (or identified) by first parameter-variable control and/or second parameter-variable control, when identifying that a condition for activation of the first parameter-variable control and/or the second parameter-variable control is no longer satisfied, the parameter setting device 230 may restore a parameter for controlling the deceleration of the host vehicle to an initial value again. For the restoration, the parameter setting device 230 may apply a restoration gain.

For example, after the parameter for controlling the deceleration of the host vehicle is changed to the first parameter and/or the second parameter, which is generated (or identified) by the first parameter-variable control and/or the second parameter-variable control, when identifying that the condition for activation of the first parameter-variable control and/or the second parameter-variable control is no longer satisfied, the parameter setting device 230 may further determine whether there is a third parameter-variable control history. For example, when the third parameter-variable control history is present, the parameter setting device 230 may change the parameter for controlling the deceleration of the host vehicle to a value, to which a third parameter is applied, based on the third parameter-variable control history.

For example, the alarm and driving control device 240 may provide information related to a parameter variation to the user through visual and/or auditory content and may be configured for controlling the driving of the host vehicle.

For example, the alarm and driving control device 240 may provide a user with a real-time process related to parameter-variable control and various pieces of information obtained through the sensor device 110 through an output device (e.g., a display and/or a speaker) in real time.

For example, the alarm and driving control device 240 may identify a changed deceleration control parameter based on at least one parameter-variable control, and may be configured for controlling the deceleration of the host vehicle based on the identified parameter.

FIG. 3 is an operation flowchart of an autonomous driving control apparatus, according to an exemplary embodiment of the present disclosure.

According to an exemplary embodiment of the present disclosure, an autonomous driving control apparatus (e.g., the autonomous driving control apparatus 100 of FIG. 1) may perform operations described in FIG. 3. For example, at least some of components (e.g., the sensor device 110, the memory 120, and/or the control device 130 in FIG. 1) included in the autonomous driving control apparatus may be set to perform operations of FIG. 3.

In the following embodiment, operation S310 to operation S340 may be sequentially performed, but are not necessarily performed sequentially. For example, the order of operations may be changed, and at least two operations may be performed in parallel. Moreover, descriptions corresponding to or identical to the above-mentioned descriptions provided with reference to FIG. 3 may be briefly described or omitted to avoid redundancy.

According to an exemplary embodiment of the present disclosure, the autonomous driving control apparatus may identify the behavior of a preceding vehicle (S310).

For example, the autonomous driving control apparatus may identify the behavior (e.g., deceleration) of at least one preceding vehicle present in a front area of a host vehicle.

According to an exemplary embodiment of the present disclosure, the autonomous driving control apparatus may identify reliability based on the behavior of the preceding vehicle (S320).

For example, the autonomous driving control apparatus may identify the reliability by use of the minimum value of decelerations of the identified preceding vehicle.

For example, the autonomous driving control apparatus may identify the reliability based on at least one of the number of data identified for each identification information (ID) of at least one preceding vehicle, the accuracy of the data, a cycle in which the data has been identified, the number of times that an error between the minimum value and other values has been identified, or any combination thereof.

For example, the autonomous driving control apparatus may be configured to determine whether the second preceding vehicle instead of a first preceding vehicle is identified as a target vehicle for first parameter-variable control, without identifying the identification information of the first preceding vehicle identified as the target vehicle. In the instant case, when failing to identify that the second preceding vehicle is the target vehicle within a first cycle, the autonomous driving control apparatus may set the reliability to a random value (e.g., 0.5) between 0 and 1 within a second cycle, which follows the first cycle, and may obtain second data regarding the second preceding vehicle. For example, when the reliability identified based on at least one of the number of second data, the accuracy of the second data, or any combination thereof is 1, the autonomous driving control apparatus may be configured to determine that at least one of the number of data, the accuracy of the data, or any combination thereof satisfies a predetermined condition.

According to an exemplary embodiment of the present disclosure, the autonomous driving control apparatus may be configured to determine whether the reliability is a specified value (S330).

For example, the specified value may be 1. However, this is an example, and embodiments of the present disclosure are not limited thereto.

For example, when the reliability is the specified value (e.g., operation S330—Yes), the autonomous driving control apparatus may perform operation S340.

For example, when the reliability is not the specified value (e.g., operation S330—No), the autonomous driving control apparatus may perform operation S335.

According to an exemplary embodiment of the present disclosure, the autonomous driving control apparatus may deactivate parameter-variable control based on the behavior of a preceding vehicle (S335).

For example, the autonomous driving control apparatus may deactivate first parameter-variable control based on the behavior of the preceding vehicle and may be configured for controlling deceleration of the host vehicle based on a parameter (e.g., a limit deceleration) thus initially set.

According to an exemplary embodiment of the present disclosure, the autonomous driving control apparatus may activate parameter-variable control based on the behavior of the preceding vehicle and may store the behavior of the preceding vehicle in a memory (S340).

For example, the autonomous driving control apparatus may be configured to generate (or identify) a first parameter by performing first parameter-variable control based on the behavior of the preceding vehicle, and may store the first parameter and/or at least part of the behavior of the preceding vehicle, which is identified while the first parameter is generated, in the memory.

For example, the autonomous driving control apparatus may perform deceleration control of the host vehicle based on the first parameter.

Figure 4:
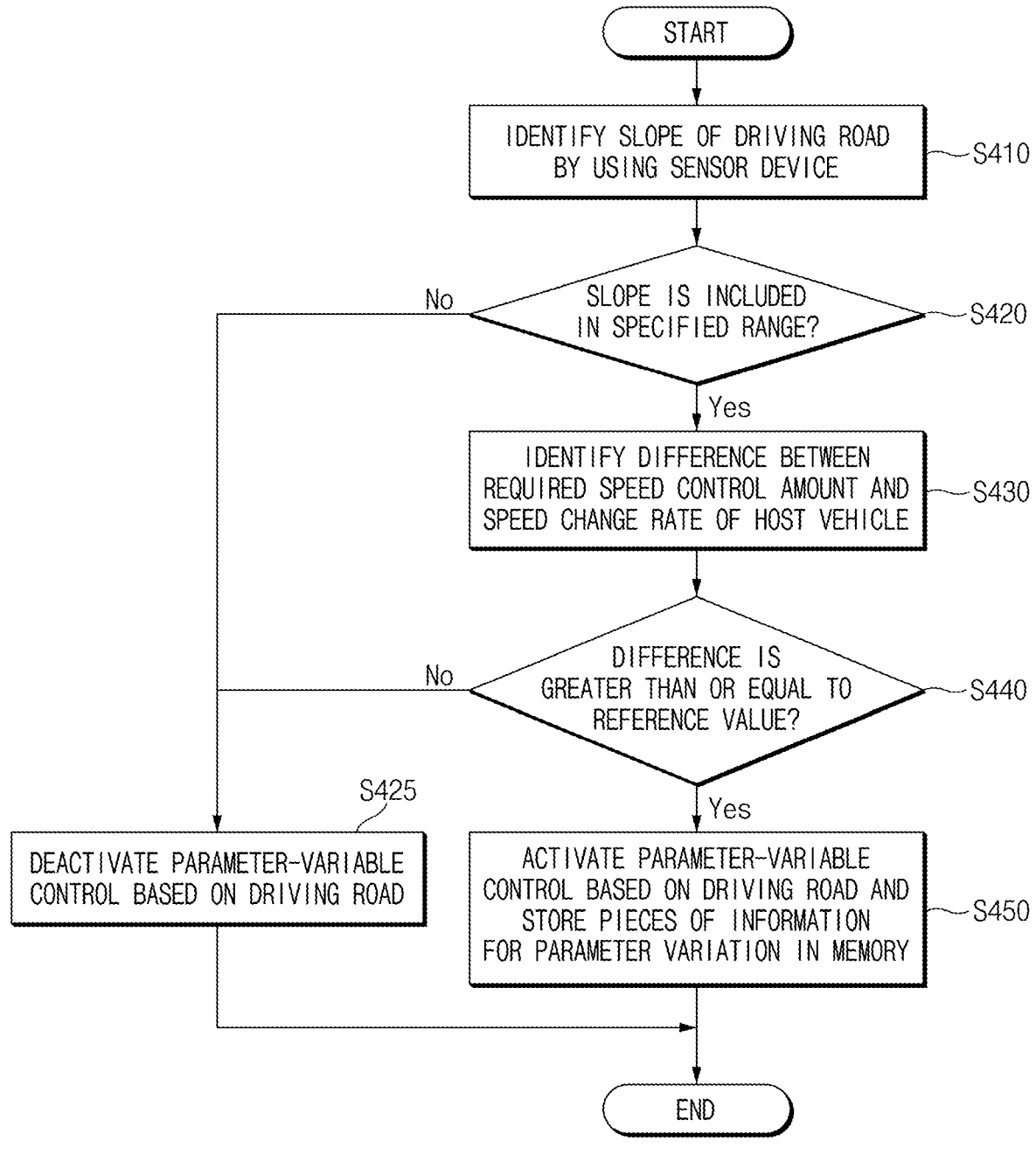
FIG. 4 is an operation flowchart of an autonomous driving control apparatus, according to an exemplary embodiment of the present disclosure.

FIG. 4 is an operation flowchart of an autonomous driving control apparatus, according to an exemplary embodiment of the present disclosure.

According to an exemplary embodiment of the present disclosure, an autonomous driving control apparatus (e.g., the autonomous driving control apparatus 100 of FIG. 1) may perform operations described in FIG. 4. For example, at least some of components (e.g., the sensor device 110, the memory 120, and/or the control device 130 in FIG. 1) included in the autonomous driving control apparatus may be set to perform operations of FIG. 4.

In the following embodiment, operation S410 to operation S450 may be sequentially performed, but are not necessarily performed sequentially. For example, the order of operations may be changed, and at least two operations may be performed in parallel. Moreover, descriptions corresponding to or identical to the above-mentioned descriptions provided with reference to FIG. 4 may be briefly described or omitted to avoid redundancy.

According to an exemplary embodiment of the present disclosure, the autonomous driving control apparatus may identify a slope of a driving road by use of a sensor device (S410).

According to an exemplary embodiment of the present disclosure, the autonomous driving control apparatus may be configured to determine whether the slope is included in the predetermined range (S420).

For example, when the slope is included in the predetermined range (e.g., operation S420—Yes), the autonomous driving control apparatus may perform operation S430.

For example, when the slope is not included in the predetermined range (e.g., operation S420—No), the autonomous driving control apparatus may perform operation S425.

For example, the autonomous driving control apparatus may deactivate second parameter-variable control based on the behavior of the preceding vehicle and may be configured for controlling deceleration of the host vehicle based on a parameter (e.g., a limit deceleration) thus initially set.

According to an exemplary embodiment of the present disclosure, the autonomous driving control apparatus may identify a difference between a required speed control amount and a speed change rate of the host vehicle (S430).

For example, the autonomous driving control apparatus may be configured for controlling the driving of the host vehicle based on the required acceleration determined based on the slope of the driving road and/or the driving situation of the host vehicle, may identify the actual acceleration of the host vehicle, and may identify a difference between required acceleration and actual acceleration.

According to an exemplary embodiment of the present disclosure, the autonomous driving control apparatus may be configured to determine whether the difference is greater than or equal to a reference value (S440).

For example, the autonomous driving control apparatus may identify a difference between the first required acceleration and the actual acceleration of the host vehicle and may be configured to determine whether the identified difference is greater than or equal to the reference value.

For example, when the difference is greater than or equal to the reference value (e.g., operation S440—Yes), the autonomous driving control apparatus may perform operation S450.

For example, when the difference is less than the reference value (e.g., operation S440—No), the autonomous driving control apparatus may perform operation S425.

According to an exemplary embodiment of the present disclosure, the autonomous driving control apparatus may deactivate parameter-variable control based on a driving road (S425).

According to an exemplary embodiment of the present disclosure, the autonomous driving control apparatus may activate parameter-variable control based on the driving road and may store pieces of information for parameter variation in a memory (S450).

For example, the autonomous driving control apparatus may be configured to generate (or identify) a second parameter by performing second parameter-variable control based on a driving road and may store the second parameter and/or at least portion of the behavior of the preceding vehicle, which is identified while the second parameter is generated, in the memory.

For example, the autonomous driving control apparatus may perform deceleration control of the host vehicle based on the second parameter.

Figure 5:
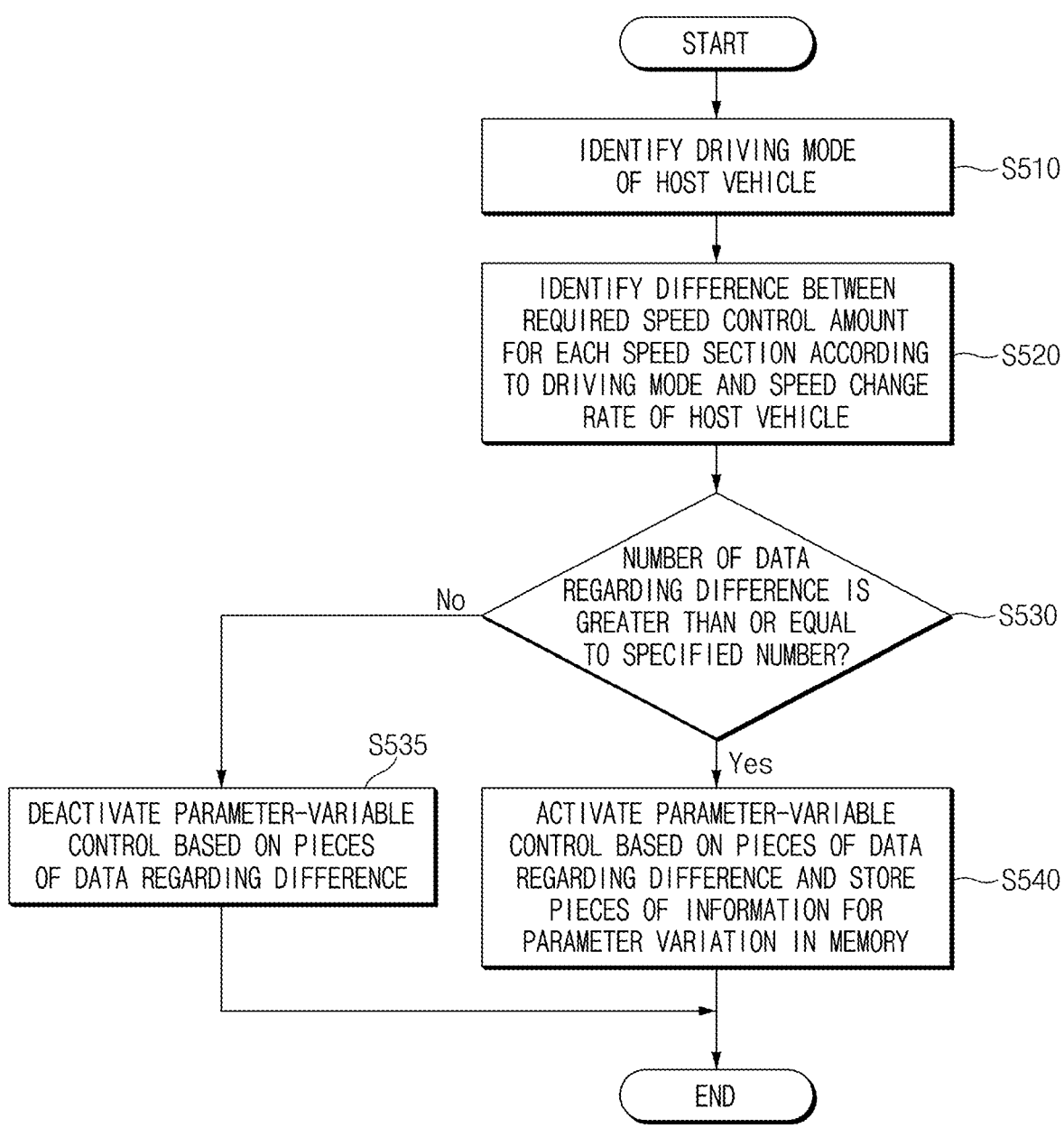
FIG. 5 is an operation flowchart of an autonomous driving control apparatus, according to an exemplary embodiment of the present disclosure.

FIG. 5 is an operation flowchart of an autonomous driving control apparatus, according to an exemplary embodiment of the present disclosure.

According to an exemplary embodiment of the present disclosure, an autonomous driving control apparatus (e.g., the autonomous driving control apparatus 100 of FIG. 1) may perform operations described in FIG. 5. For example, at least some of components (e.g., the sensor device 110, the memory 120, and/or the control device 130 in FIG. 1) included in the autonomous driving control apparatus may be set to perform operations of FIG. 5.

In the following embodiment, operation S510 to operation S540 may be sequentially performed, but are not necessarily performed sequentially. For example, the order of operations may be changed, and at least two operations may be performed in parallel. Moreover, descriptions corresponding to or identical to the above-mentioned descriptions provided with reference to FIG. 5 may be briefly described or omitted to avoid redundancy.

According to an exemplary embodiment of the present disclosure, the autonomous driving control apparatus may identify a driving mode of the host vehicle (S510).

For example, the autonomous driving control apparatus may identify the driving mode used for driving control of a host vehicle among various driving modes (e.g., an economical mode, a comfort mode, and a sports mode).

According to an exemplary embodiment of the present disclosure, the autonomous driving control apparatus may identify a difference between a required speed control amount for each speed section according to the driving mode and a speed change rate of the host vehicle (S520).

For example, the autonomous driving control apparatus may identify the required speed control amount (or required acceleration) set for each speed section of the identified driving mode, may identify the actual acceleration of the host vehicle, and may identify a difference between the required speed control amount and actual acceleration.

According to an exemplary embodiment of the present disclosure, the autonomous driving control apparatus may be configured to determine whether the number of data regarding the identified difference is greater than or equal to the predetermined number (S530).

For example, the autonomous driving control apparatus may be configured to determine whether the number of data regarding the difference between required acceleration and actual acceleration is greater than or equal to the predetermined number (e.g., 300) (or specified capacity).

For example, when the number of data regarding the difference between required acceleration and actual acceleration is greater than or equal to the predetermined number (e.g., operation S530—Yes), the autonomous driving control apparatus may perform operation S540.

For example, when the number of data regarding the difference between required acceleration and actual acceleration is less than the predetermined number (e.g., operation S530—No), the autonomous driving control apparatus may perform operation S535.

According to an exemplary embodiment of the present disclosure, the autonomous driving control apparatus may deactivate parameter-variable control based on pieces of data regarding the identified difference (S535).

For example, the autonomous driving control apparatus may deactivate third parameter-variable control based on pieces of data of identified difference and may be configured for controlling deceleration of the host vehicle based on a parameter (e.g., a limit deceleration) thus initially set.

According to an exemplary embodiment of the present disclosure, the autonomous driving control apparatus may activate parameter-variable control based on the pieces of data regarding identified difference and may store pieces of information for parameter variation in a memory (S540).

For example, the autonomous driving control apparatus may be configured to generate (or identify) a third parameter by performing third parameter-variable control based on the pieces of data of the difference and may store the third parameter and/or at least portion of the behavior of the preceding vehicle, which is identified while the third parameter is generated, in the memory.

For example, the autonomous driving control apparatus may perform deceleration control of the host vehicle based on the third parameter.

FIG. 6 is an operation flowchart of an autonomous driving control apparatus, according to an exemplary embodiment of the present disclosure.

According to an exemplary embodiment of the present disclosure, an autonomous driving control apparatus (e.g., the autonomous driving control apparatus 100 of FIG. 1) may perform operations described in FIG. 6. For example, at least some of components (e.g., the sensor device 110, the memory 120, and/or the control device 130 in FIG. 1) included in the autonomous driving control apparatus may be set to perform operations of FIG. 6.

In the following embodiment, operation S610 to operation S640 may be sequentially performed, but are not necessarily performed sequentially. For example, the order of operations may be changed, and at least two operations may be performed in parallel. Moreover, descriptions corresponding to or identical to the above-mentioned descriptions provided with reference to FIG. 6 may be briefly described or omitted to avoid redundancy.

According to an exemplary embodiment of the present disclosure, the autonomous driving control apparatus may identify a first parameter for parameter-variable control based on the behavior of a preceding vehicle (S610).

For example, the autonomous driving control apparatus may identify the first parameter based on the above-described operations described in FIG. 3.

According to an exemplary embodiment of the present disclosure, the autonomous driving control apparatus may identify a second parameter for parameter-variable control based on a driving road (S620).

For example, the autonomous driving control apparatus may identify the second parameter based on the above-described operations described in FIG. 4.

According to an exemplary embodiment of the present disclosure, the autonomous driving control apparatus may identify a third parameter for parameter-variable control based on pieces of data regarding a difference between the required acceleration identified based on a driving mode and an actual acceleration of the host vehicle (S630).

For example, the autonomous driving control apparatus may identify a third parameter based on the above-described operations described above in FIG. 5.

According to an exemplary embodiment of the present disclosure, the autonomous driving control apparatus may identify a minimum value among the identified parameters as a final control amount (S640).

For example, the autonomous driving control apparatus may identify the minimum value among the first parameter, the second parameter, and the third parameter, which are identified based on operation S610 to operation S630, as the final control amount for deceleration control of the host vehicle.

FIG. 7 is an operation flowchart of an autonomous driving control apparatus, according to an exemplary embodiment of the present disclosure.

According to an exemplary embodiment of the present disclosure, an autonomous driving control apparatus (e.g., the autonomous driving control apparatus 100 of FIG. 1) may perform operations described in FIG. 7. For example, at least some of components (e.g., the sensor device 110, the memory 120, and/or the control device 130 in FIG. 1) included in the autonomous driving control apparatus may be set to perform operations of FIG. 7.

In the following embodiment, operation S710 to operation S730 may be sequentially performed, but are not necessarily performed sequentially. For example, the order of operations may be changed, and at least two operations may be performed in parallel. Moreover, descriptions corresponding to or identical to the above-mentioned descriptions provided with reference to FIG. 7 may be briefly described or omitted to avoid redundancy.

According to an exemplary embodiment of the present disclosure, the autonomous driving control apparatus may identify information related to at least one of the driving state of a host vehicle, the driving mode of the host vehicle, the driving road of the host vehicle, the behavior state of at least one other vehicle adjacent to the host vehicle, or any combination thereof by use of a sensor device (S710).

For example, the information related to the driving state of the host vehicle may include at least one of the driving acceleration and/or deceleration of the host vehicle, the driving speed of the host vehicle, the driving direction of the host vehicle, or any combination thereof.

For example, the information related to the driving mode of the host vehicle may include a required acceleration for each speed section of a driving mode, in which the host vehicle is actually driving, from among various driving modes (e.g., an economical mode, a comfort mode, and a sports mode) available when the autonomous driving control apparatus is configured to control the host vehicle.

For example, the information related to the driving road may include information related to a slope of the driving road on which the host vehicle is driving.

For example, the information related to the behavior state of at least one other vehicle adjacent to the host vehicle may include information related to at least one of a driving acceleration of at least one other vehicle placed in a front area of the host vehicle, a driving speed of the at least one other vehicle, a driving direction of the at least one other vehicle, or any combination thereof.

According to an exemplary embodiment of the present disclosure, the autonomous driving control apparatus may activate at least one parameter-variable control for deceleration control of the host vehicle by use of the identified information (S720).

For example, the autonomous driving control apparatus may activate at least one parameter-variable control and may be configured to generate (or identify) a parameter corresponding to each parameter-variable control.

According to an exemplary embodiment of the present disclosure, the autonomous driving control apparatus may be configured for controlling the deceleration of the host vehicle by use of a minimum value among at least one parameter identified based on at least one parameter-variable control thus activated (S730).

For example, the autonomous driving control apparatus may set the identified minimum value as a limit deceleration value of deceleration.

Figure 8:
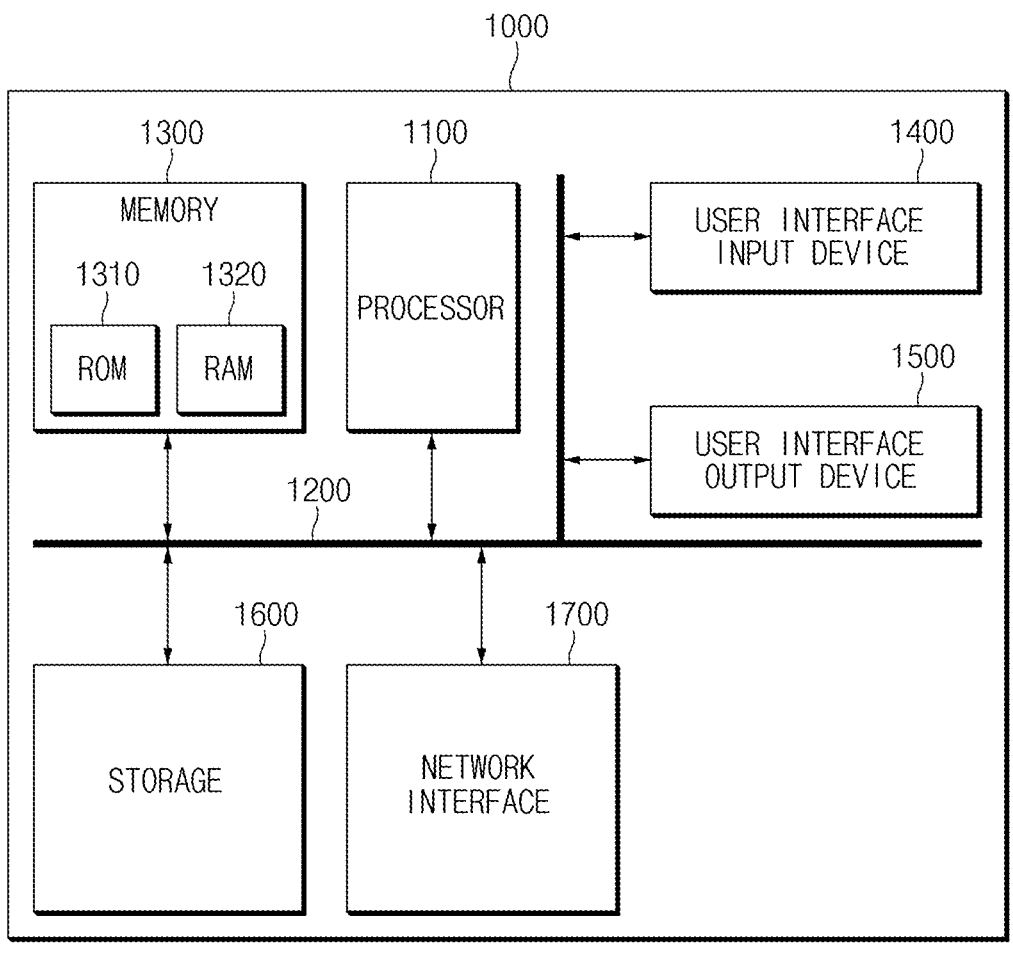
FIG. 8 illustrates a computing system related to an autonomous driving control method, according to an exemplary embodiment of the present disclosure.

FIG. 8 illustrates a computing system related to an autonomous driving control method, according to an exemplary embodiment of the present disclosure.

Referring to FIG. 8, a computing system 1000 related to an autonomous driving control method may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications and modifications may be made by one skilled in the art without departing from the essential characteristic of the present disclosure.

Accordingly, various exemplary embodiments of the present disclosure are intended not to limit but to explain technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

Descriptions of an autonomous driving control apparatus according to an exemplary embodiment of the present disclosure, and a method thereof are as follows.

According to at least one of embodiments of the present disclosure, an autonomous driving control apparatus may be configured to generate a parameter for varying a limit value of acceleration and/or deceleration of the host vehicle by use of information related to the driving situation of the host vehicle or at least one other vehicle placed in an adjacent to area.

Moreover, according to at least one of embodiments of the present disclosure, rather than uniformly generating a control amount for driving control of the host vehicle, an autonomous driving control apparatus may flexibly control the acceleration and/or deceleration of the host vehicle by use of at least one of a difference between a required acceleration determined (or identified) by a control device for control and a real-time actual acceleration of the host vehicle driven based on the required acceleration value, a driving situation of host vehicle, or any combination thereof.

Furthermore, according to at least one of embodiments of the present disclosure, the possibility of a dangerous situation occurring in a relative relationship with other vehicles may be minimized by changing the deceleration limit value of the host vehicle in consideration of the other vehicle driving situation in the adjacent to area.

Besides, a variety of effects directly or indirectly understood through the present disclosure may be provided.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An autonomous driving control apparatus, the apparatus comprising:
    a sensor device;
    a memory configured to store instructions; and
    a control device operatively connected to the sensor device and the memory,
    wherein the instructions, in response to execution of the control device, cause the autonomous driving control apparatus to:
        identify information related to at least one of a driving state of a host vehicle, a driving mode of the host vehicle, a driving road of the host vehicle, a behavior state of at least one other vehicle adjacent to the host vehicle, or a combination of the driving state, the driving mode, the driving road, and the behavior state by use of the sensor device;
        activate at least one parameter-variable control for deceleration control of the host vehicle by use of the information; and
        control a deceleration of the host vehicle by use of a minimum value among at least one parameter identified based on the at least one parameter-variable control thus activated,
        wherein the other vehicle include a first vehicle and a second vehicle which are present in front of the host vehicle,
        wherein the instructions, in response to execution of the control device, cause the autonomous driving control apparatus to determine whether the second vehicle instead of the first vehicle is identified as a target vehicle for the first parameter-variable control, in response that identification information of the second vehicle different from the first vehicle is identified while first data regarding a behavior of the first vehicle among the at least one other vehicle is identified, and wherein the at least one parameter-variable control comprises: a first parameter-variable control configured to generate a first parameter based on a behavior state of at least one preceding vehicle; a second parameter-variable control configured to generate a second parameter based on a slope of a driving road on which the host vehicle is driving; and a third parameter-variable control configured to generate a third parameter based on characteristics of the driving mode of the host vehicle, and wherein the control device is configured to identify, as a final control amount for deceleration of the host vehicle, a minimum value among the first parameter, the second parameter, and the third parameter when a plurality of the parameters are identified.

2. The apparatus of claim 1, wherein the at least one parameter-variable control includes the first parameter-variable control, and wherein the instructions, in response to execution of the control device, cause the autonomous driving control apparatus to:

identify the behavior state of the at least one other vehicle including data regarding a deceleration of the at least one other vehicle, which is present in front of the host vehicle, by use of the sensor device;

activate the first parameter-variable control based on the behavior state of the at least one other vehicle in response that at least one of a number of the data, an accuracy of the data, or a combination of the number of the data and the accuracy of the data satisfies a predetermined condition; and control the deceleration of the host vehicle through the first parameter, which is identified by use of the behavior state of the at least one other vehicle, based on the first parameter-variable control.

3. The apparatus of claim 2, wherein the instructions, in response to execution of the control device, cause the autonomous driving control apparatus to:

determine that at least one of the number of the data, the accuracy of the data, or the combination of the number of the data and the accuracy of the data satisfies the predetermined condition, in response that the number of the data regarding the first vehicle among the at least one other vehicle is repeatedly identified within a predetermined cycle or more than predetermined cycle, or other data regarding the first vehicle, which includes a difference of a predetermined value or less than the predetermined value from the data, is identified a predetermined number of times or more than the predetermined number of time.

4. The apparatus of claim 2, wherein the instructions, in response to execution of the control device, cause the autonomous driving control apparatus to:

set a reliability to a random value between 0 and 1 within a second cycle, which is a cycle following a first cycle, and obtain second data regarding the second vehicle in response that the second vehicle is not identified as the target vehicle within the first cycle; and determine that at least one of the number of the data, the accuracy of the data, or the combination of the number of the data and the accuracy of the data satisfies the predetermined condition, in response that the reliability identified based on at least one of a number of the second data, an accuracy of the second data, or a combination of the number of the second data and the accuracy of the second data is 1.

5. The apparatus of claim 1, wherein the at least one parameter-variable control includes the second parameter-variable control, and wherein the instructions, in response to execution of the control device, cause the autonomous driving control apparatus to:

identify a slope of the driving road by use of the sensor device; and determine whether to activate the second parameter-variable control based on the slope, based on at least one of whether the slope is included in a predetermined range, a first required acceleration, an actual acceleration of the host vehicle, or a combination of whether the slope is included in the predetermined range, the first required acceleration, and the actual acceleration of the host vehicle.

6. The apparatus of claim 5, wherein the instructions, in response to execution of the control device, cause the autonomous driving control apparatus to:

activate the second parameter-variable control in response that the slope is included in the predetermined range, and a difference between the first required acceleration and the actual acceleration is greater than or equal to a reference value; and control the deceleration of the host vehicle through the second parameter, which is identified by use of the difference, based on the second parameter-variable control.

7. The apparatus of claim 1, wherein the at least one parameter-variable control includes the third parameter-variable control, and wherein the instructions, in response to execution of the control device, cause the autonomous driving control apparatus to:

identify the driving mode of the host vehicle by use of the sensor device; and determine whether to activate the third parameter-variable control based on characteristics of the driving mode, based on at least one of the driving mode, a second required acceleration for each speed section of the driving mode, an actual acceleration of the host vehicle, or a combination of the driving mode, the second required acceleration for each speed section of the driving mode, and the actual acceleration of the host vehicle.

8. The apparatus of claim 7, wherein the instructions, in response to execution of the control device, cause the autonomous driving control apparatus to:

activate the third parameter-variable control, in response that error data including a difference between the second required acceleration and the actual acceleration is greater than or equal to a predetermined number; and control the deceleration of the host vehicle through the third parameter, which is identified by use of an average error value of the error data, based on the third parameter-variable control.

9. The apparatus of claim 1, wherein the instructions, in response to execution of the control device, cause the autonomous driving control apparatus to:

restore a parameter for controlling the deceleration of the host vehicle to a value prior to using the minimum value, based on identifying that the behavior state or a slope of the driving road does not satisfy a condition for generating a parameter, while controlling the deceleration of the host vehicle by use of the minimum value corresponding to the first parameter generated based on the behavior state of the at least one other vehicle or the second parameter generated based on the slope of the driving road.

10. The apparatus of claim 9, wherein the instructions, in response to execution of the control device, cause the autonomous driving control apparatus to:

determine whether there is a history in which the third parameter generated based on characteristics of the driving mode of the host vehicle is applied to control the deceleration, while controlling the deceleration of the host vehicle, based on the minimum value corresponding to the first parameter or the second parameter, in response that identifying that the behavior state or the slope does not satisfy the condition for generating the parameter; and change the parameter for controlling the deceleration of the host vehicle to a value to which the third parameter is applied, in response that the history is present.

11. An autonomous driving control method, the method comprising:

identifying, by a control device, information related to at least one of a driving state of a host vehicle, a driving mode of the host vehicle, a driving road of the host vehicle, a behavior state of at least one other vehicle adjacent to the host vehicle, or a combination of the driving state, the driving mode, the driving road, and the behavior state by use of a sensor device;

activating, by the control device, at least one parameter-variable control for deceleration control of the host vehicle by use of the information; and controlling, by the control device, a deceleration of the host vehicle by use of a minimum value among at least one parameter identified based on the at least one parameter-variable control thus activated, wherein the other vehicle include a first vehicle and a second vehicle which are present in front of the host vehicle, and wherein the activating, by the control device, of the first parameter-variable control based on the behavior state of the at least one other vehicle in response that the at least one of the number of the data, the accuracy of the data, or the combination of the number of the data and the accuracy of the data satisfies the predetermined condition further includes:

determining, by the control device, whether the second vehicle instead of the first vehicle is identified as a target vehicle for the first parameter-variable control, in response that identification information of the second vehicle different from the first vehicle is identified while first data regarding a behavior of the first vehicle among the at least one other vehicle is identified, wherein the at least one parameter-variable control comprises: generating, by the control device, a first parameter based on a behavior state of at least one preceding vehicle; generating, by the control device, a second parameter based on a slope of a driving road on which the host vehicle is driving; and generating, by the control device, a third parameter based on characteristics of a driving mode of the host vehicle, and identifying, by the control device, a minimum value among the first parameter, the second parameter, and the third parameter as a final control amount for deceleration of the host vehicle when a plurality of the parameters are identified.

12. The method of claim 11, wherein the at least one parameter-variable control includes the first parameter-variable control, and wherein the controlling, by the control device, of the deceleration of the host vehicle further includes:

identifying, by the control device, the behavior state of the at least one other vehicle including data regarding a deceleration of the at least one other vehicle, which is present in front of the host vehicle, by use of the sensor device;

activating, by the control device, the first parameter-variable control based on the behavior state of the at least one other vehicle in response that at least one of a number of the data, an accuracy of the data, or a combination of the number of the data and the accuracy of the data satisfies a predetermined condition; and controlling, by the control device, the deceleration of the host vehicle through the first parameter, which is identified by use of the behavior state of the at least one other vehicle, based on the first parameter-variable control.

13. The method of claim 12, wherein the activating, by the control device, of the first parameter-variable control based on the behavior state of the at least one other vehicle in response that the at least one of the number of the data, the accuracy of the data, or the combination of the number of the data and the accuracy of the data satisfies the predetermined condition further includes:

determining, by the control device, that at least one of the number of the data, the accuracy of the data, or the combination of the number of the data and the accuracy of the data satisfies the predetermined condition, in response that the number of the data regarding the first vehicle among the at least one other vehicle is repeatedly identified within a predetermined cycle or more than predetermined cycle, or other data regarding the first vehicle, which includes a difference of a predetermined value or less than the predetermined value from the data, is identified a predetermined number of times or more than the predetermined number of time.

14. The method of claim 12, wherein the activating, by the control device, of the first parameter-variable control based on the behavior state of the at least one other vehicle in response that the at least one of the number of the data, the accuracy of the data, or the combination of the number of the data and the accuracy of the data satisfies the predetermined condition further includes:

setting, by the control device, a reliability to a random value between 0 and 1 within a second cycle, which is a cycle following a first cycle, and obtaining second data regarding the second vehicle, in response that the second vehicle is not identified as the target vehicle within the first cycle; and determining, by the control device, that at least one of the number of the data, the accuracy of the data, or the combination of the number of the data and the accuracy of the data satisfies the predetermined condition, in response that the reliability identified based on at least one of a number of the second data, an accuracy of the second data, or a combination of the number of the second data and the accuracy of the second data is 1.

15. The method of claim 11, wherein the at least one parameter-variable control includes a second parameter-variable control, and wherein the controlling, by the control device, of the deceleration of the host vehicle further includes:

identifying, by the control device, a slope of the driving road by use of the sensor device; and determining, by the control device, whether to activate the second parameter-variable control based on the slope, based on at least one of whether the slope is included in a predetermined range, a first required acceleration, an actual acceleration of the host vehicle, or a combination of whether the slope is included in the predetermined range, the first required acceleration, and the actual acceleration of the host vehicle.

16. The method of claim 15, wherein the controlling, by the control device, of the deceleration of the host vehicle further includes:

activating, by the control device, the second parameter-variable control in response that the slope is included in the predetermined range, and a difference between the first required acceleration and the actual acceleration is greater than or equal to a reference value; and controlling, by the control device, the deceleration of the host vehicle through the second parameter, which is identified by use of the difference, based on the second parameter-variable control.

17. The method of claim 11, wherein the at least one parameter-variable control includes a third parameter-variable control, and wherein the controlling, by the control device, of the deceleration of the host vehicle further includes:

identifying, by the control device, the driving mode of the host vehicle by use of the sensor device; and determining, by the control device, whether to activate the third parameter-variable control based on characteristics of the driving mode, based on at least one of the driving mode, a second required acceleration for each speed section of the driving mode, an actual acceleration of the host vehicle, or a combination of the driving mode, the second required acceleration for each speed section of the driving mode, and the actual acceleration of the host vehicle.

18. The method of claim 17, wherein the controlling, by the control device, of the deceleration of the host vehicle further includes:

activating, by the control device, the third parameter-variable control, in response that error data including a difference between the second required acceleration and the actual acceleration is greater than or equal to a predetermined number; and controlling, by the control device, the deceleration of the host vehicle through the third parameter, which is identified by use of an average error value of the error data, based on the third parameter-variable control.

19. The method of claim 11, further including:

restoring, by the control device, a parameter for controlling the deceleration of the host vehicle to a value prior to using a minimum value, based on identifying that the behavior state or a slope of the driving road does not satisfy a condition for generating a parameter, while controlling the deceleration of the host vehicle by use of the minimum value corresponding to the first parameter generated based on the behavior state of the at least one other vehicle or the second parameter generated based on the slope of the driving road.

20. The method of claim 19, further including:

determining, by the control device, whether there is a history in which the third parameter generated based on characteristics of the driving mode of the host vehicle is applied to control the deceleration, while controlling the deceleration of the host vehicle, based on the minimum value corresponding to the first parameter or the second parameter, in response that identifying that the behavior state or the slope does not satisfy the condition for generating the parameter; and changing, by the control device, the parameter for controlling the deceleration of the host vehicle to a value to which the third parameter is applied, when the history is present.

* * * * *